US012650302B2

(12) United States Patent
Gao et al.

(10) Patent No.: US 12,650,302 B2
(45) Date of Patent: Jun. 9, 2026

(54) REAL-TIME MONITORING DEVICE FOR POLAR NEARSHORE MARINE ENVIRONMENT

(71) Applicant: Jiangsu University of Science and Technology, Zhenjiang (CN)

(72) Inventors: Junliang Gao, Zhenjiang (CN); Linhui Hou, Zhenjiang (CN); Rongjun Sun, Zhenjiang (CN); Changpeng Zhang, Zhenjiang (CN)

(73) Assignee: Jiangsu University of Science and Technology, Zhenjiang (CN)

( * ) Notice: Subject to any disclaimer, the term of this patent is extended or adjusted under 35 U.S.C. 154(b) by 248 days.

(21) Appl. No.: 18/744,726

(22) Filed: Jun. 17, 2024

(65) Prior Publication Data

US 2025/0189308 A1     Jun. 12, 2025

(30) Foreign Application Priority Data

Dec. 12, 2023   (CN) .......................... 202311701899.5

(51) Int. Cl.
| | |
|---|---|
| *G01C 13/00* | (2006.01) |
| *B08B 1/16* | (2024.01) |
| *B63B 22/00* | (2006.01) |
| *B63B 59/08* | (2006.01) |

(52) U.S. Cl.
CPC .............. *G01C 13/00* (2013.01); *B08B 1/165* (2024.01); *B63B 22/00* (2013.01); *B63B 59/08* (2013.01); *B63B 2022/006* (2013.01)

(58) Field of Classification Search
CPC ......... G01C 13/00; B08B 1/165; B63B 22/00; B63B 2022/006; B63B 59/08
See application file for complete search history.

(56) References Cited

FOREIGN PATENT DOCUMENTS

CN          113844592 A  * 12/2021   ............. B01D 35/05

* cited by examiner

*Primary Examiner* — Jill E Culler
(74) *Attorney, Agent, or Firm* — Hemisphere Law, PLLC

(57)          ABSTRACT

A real-time monitoring device for a polar nearshore marine environment is provided, including a cabin body, a main control cabin and a scraping structure, an outer wall of the cabin body is provided with collecting holes, an electric motor is arranged in the main control cabin, the electric motor provides power through a first rotating rod penetrating a side wall of the main control cabin. The scraping structure includes a power structure, a scraper and a collecting bucket, the scraper is arranged outside the cabin body and is fixedly provided with the collecting bucket. The power structure is connected to the first rotating rod and drives the scraper and the collecting bucket to rotate relative to the cabin body, the collecting bucket collects the floating objects on the outer wall and around the cabin body, and the floating objects enter the cabin body through the collecting holes.

10 Claims, 8 Drawing Sheets

Water line

REAL-TIME MONITORING DEVICE FOR POLAR NEARSHORE MARINE ENVIRONMENT

TECHNICAL FIELD

The present disclosure relates to the technical field of monitoring devices, and in particular to a real-time monitoring device for a polar nearshore marine environment.

BACKGROUND

Polar nearshore ocean refers to the ocean area around the coastline near the Arctic and Antarctic, including the sea area around the Arctic Sea and Antarctica. A real-time monitoring device for a marine environment refers to a device capable of monitoring marine environmental parameters in real time, which can monitor various physical, chemical and biological parameters in the ocean in real time, such as a water temperature, salinity, a flow velocity, a sea level height, turbidity, a chlorophyll concentration, a phytoplankton density, benthos quantity and biological activities. By monitoring these parameters in real time, changes and trends of the marine environment can be timely known, so as to provide scientific basis and decision-making support for marine environmental management, resource development and environmental protection.

A marine monitoring device in the prior art can perform long-term real-time monitoring on a designated sea area. However, in recent years, with development of polar regions and more and more activities of human beings in the polar regions, some domestic garbage will be generated and thrown into the sea. The device is located a nearshore place during monitoring. Although the temperature in the polar regions is relatively low, algae in water bodies can still grow and reproduce when the sunshine is sufficient in summer, and some algae will release toxic substances, which may cause harm to marine organisms. In some cases, the nearshore monitoring device may be attached by the algae, which may be likely to cause corrosion or damage to the surface of the device due to growth of the algae, thus affecting collection of the monitoring device and causing information deviation.

SUMMARY

Based on defects of the prior art, an objective of the present disclosure is to provide a real-time monitoring device for a polar nearshore marine environment. The floating objects on an outer wall of a cabin body can be scraped off, such that the floating objects on the outer wall and a periphery of the cabin body can be collected, and the floating objects are prevented from corroding or damaging a surface of the device.

In order to solve the above problems, the present disclosure employs the technical solutions as follows:

A real-time monitoring device for a polar nearshore marine environment includes:

a cabin body, where an outer wall of the cabin body is provided with collecting holes;

a main control cabin arranged inside the cabin body, where an electric motor is arranged in the main control cabin, and the electric motor provides power through a first rotating rod penetrating a side wall of the main control cabin; and a scraping structure including a power structure, a scraper and a collecting bucket, where at least one scraper is arranged outside the cabin body, the collecting bucket is fixed on the scraper, the power structure is arranged outside the main control cabin and connected to the first rotating rod, the power structure drives at least one scraper and at least one collecting bucket to rotate relative to the cabin body, such that the collecting bucket collects floating objects on the outer wall and a periphery of the cabin body, and the floating objects enter the cabin body through the collecting holes.

Optionally, a side wall of the collecting bucket is hollowed out, and a cross section of the collecting bucket is a sector.

Optionally, when a plurality of scrapers are arranged, the plurality of scrapers take a center of the cabin body as an axis to form an array, and correspondingly, the plurality of collecting buckets take the center of the cabin body as an axis to form an array.

Optionally, the power structure includes a toothed plate and a toothed ring. The toothed ring is slidably connected on the main control cabin, and the toothed plate is arranged outside the main control cabin and meshed with the toothed ring. The toothed plate is fixed on the first rotating rod, and the scraper is connected to the toothed ring.

Optionally, the monitoring device further includes a rotating structure, and the rotating structure includes a supporting rod, a sliding ring, a circular rotating plate and a T-shaped sliding strip. The supporting rod is fixed on the scraper, two ends of the sliding ring are fixed on two sides of the supporting rod, and the sliding ring is slidably connected on the cabin body. The circular rotating plate is fixed on the toothed ring, the T-shaped sliding strip is slidably mounted on an inner wall of the circular rotating plate, and the T-shaped sliding strip is fixedly mounted on the main control cabin.

Optionally, when a plurality of scrapers are arranged, the number of the sliding rings and the supporting rods is consistent with that of the scrapers. Both sides of each of the sliding rings are fixedly mounted on one sides of every two supporting rods, and the plurality of sliding rings and the plurality of supporting rods are capable of forming a complete circle.

Optionally, the monitoring device further includes an isolation structure, where the isolation structure includes a partition plate, the partition plate is fixed on the rotating structure and is arranged at an inner side of the cabin body, and a notch is provided in the partition plate. When the partition plate is driven to rotate by the rotating structure so as to be in communication with the collecting holes, the cabin body is opened, and the floating objects are capable of entering the cabin body through the collecting holes and the notch. When the partition plate is driven to rotate by the rotating structure, so as not to be in communication with the collecting holes, the cabin body is sealed, and the floating objects fail to enter the cabin body through the collecting holes and the notch.

Optionally, the isolation structure further includes a pressing plate, and the pressing plate is slidably connected on an inner wall of the partition plate. The partition plate is divided into an upper layer and a lower layer by the pressing plate, the notch is provided in the lower layer of the partition plate, and the pressing plate is driven to lift by a lifting structure.

Optionally, the pressing plate is provided with a rectangular groove, the lifting structure includes a block-driving rotating plate, a supporting strip and a T-shaped block, and the block-driving rotating plate is fixed to the first rotating rod. One end of the T-shaped block is fixed on the block-driving rotating plate, the other end of the T-shaped block is rotationally connected to the supporting strip, and a bottom end of the supporting strip is provided with a first rotating block.

Optionally, the monitoring device further includes a filtering structure. The filtering structure includes a filtering plate and a baffle plate, the baffle plate is arranged at a bottom of the filtering plate, and the baffle plate is capable of being rotationally connected onto the cabin body.

Compared to the prior art, the present disclosure has the advantages and beneficial effects as follows:

First, according to the present disclosure, when the monitoring device performs monitoring, the device is firstly fixed in a designated sea area, and then various indexes of the sea area are collected and monitored. Moreover, the scraping structure is arranged to scrape off the floating objects on the outer wall of the cabin body, such that the floating objects on the outer wall and the periphery of the cabin body can be collected, and the floating objects are prevented from corroding or damaging the surface of the device.

Second, the scraping structure is arranged, when the monitoring device runs, firstly, the scraper is driven by the power structure to rotate along the outer wall of the cabin body to scrape off and clear algae attached to the surface of the device, and simultaneously, the collecting bucket is driven to rotate for scraping against the outer wall of the cabin body, collect garbage and the algae around the device, and collect the garbage and the algae into the cabin body from the collecting holes, such that the problems that the algae may adhere to the device and garbage around the device may affect the monitoring structure of the device during running of the device are solved, the monitoring accuracy of the device is enhanced, and a service life of the device is prolonged.

Third, the collecting bucket is arranged, and when the scraper drives the collecting bucket to operate, resistance brought by water can be offset through the hollowed-out design of the side wall of the collecting bucket. When the water and the garbage are collected into the inner wall of the collecting bucket, the garbage and the algae can be retained while the water is discharged. In addition, the cross section of the collecting bucket is the sector, such that after the garbage is collected into the inner wall of the collecting bucket, the garbage can be collected into the inner wall of the cabin body from the collecting holes along the shape of the inner wall of the collecting bucket, thereby solving the problem that the device shakes unstably due to excessive resistance generated by the collecting bucket and the water in the rotating process, reducing resistance between the collecting bucket and the water, and also enhancing a collecting effect of the collecting bucket.

BRIEF DESCRIPTION OF THE DRAWINGS

The accompanying drawings described herein are used for providing further understanding of the present disclosure, which form a part of the present disclosure. The illustrative examples of the present disclosure and the specification thereof are used for explaining the present disclosure, which are not intended to unduly limit the present disclosure. In the accompanying drawings.

Figure 1:
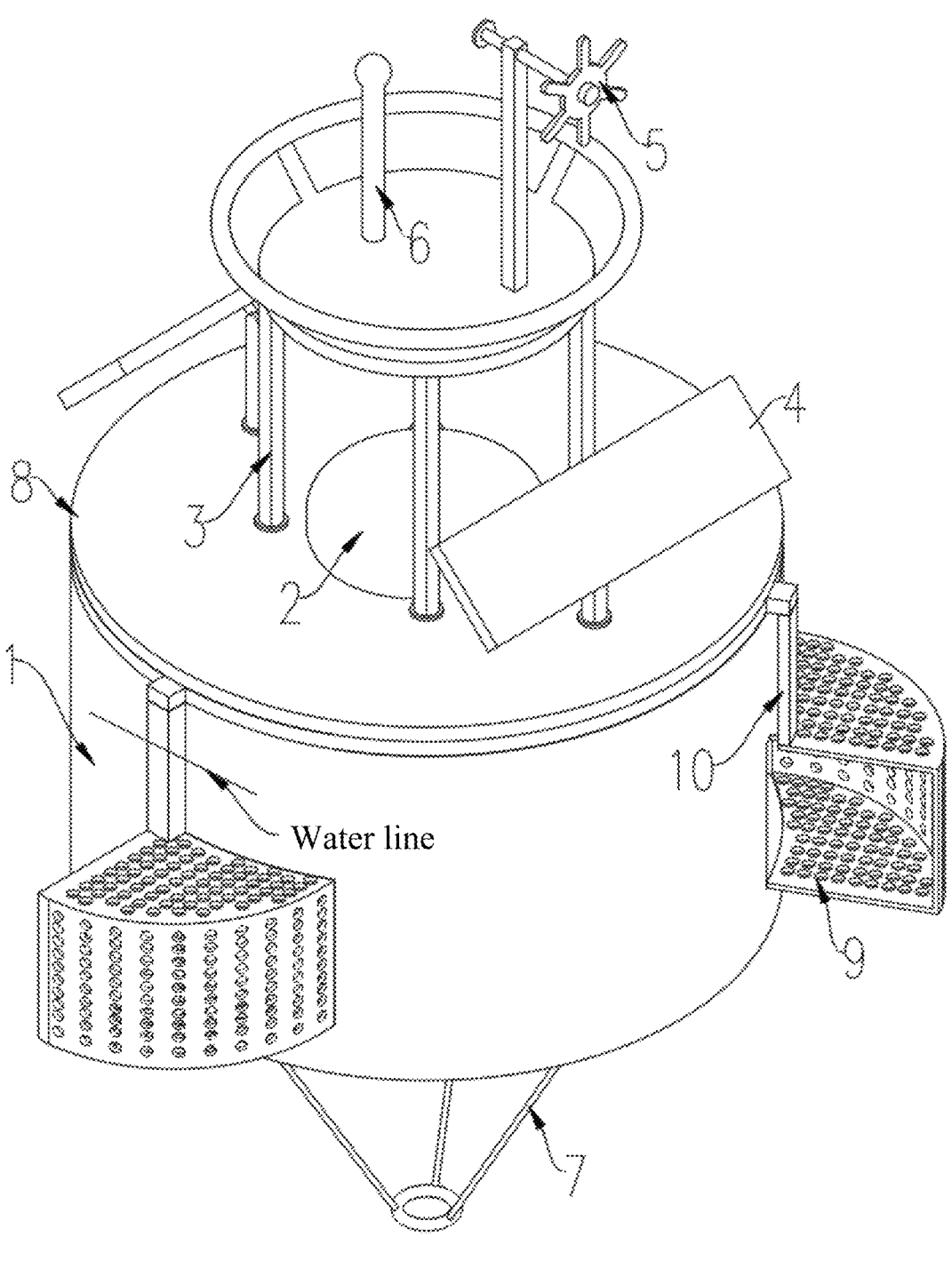
FIG. 1 is a schematic diagram of an integral structure of the present disclosure.

In the figures: 1, cabin body; 2, main control cabin; 3, supporting frame; 4, solar panel; 5, wind vane; 6, signal transmitter; 7, anchor frame; 8, top plate; 9, collecting bucket; 10, scraper; 11, supporting rod; 12, sliding ring; 13, collecting hole; 14, partition plate; 15, T-shaped sliding strip; 16, toothed ring; 17, toothed plate; 18, first rotating rod; 19, block-driving rotating plate; 20, supporting strip; 21, first rotating block; 22, rectangular groove; 23, electric motor; 24, pressing plate; 25, baffle plate; 26, U-shaped block; 27, second rotating block; 28, supporting block; 29, tension spring; 30, filtering plate; 31, circular rotating plate; 32, circular groove; 33, notch type groove hole; 34, T-shaped block; and 35, second rotating rod.

DETAILED DESCRIPTION OF THE EMBODIMENTS

The technical solutions in the examples of the present disclosure will be clearly and completely described below with reference to the accompanying drawings in the examples of the present disclosure. Obviously, the described examples are merely some examples rather than all examples of the present disclosure. All the other examples obtained by those of ordinary skill in the art based on the examples in the present disclosure without creative efforts shall fall within the scope of protection of the present disclosure.

Embodiment 1

A real-time monitoring device for a polar nearshore marine environment is shown in FIGS. 1-8, and includes a cabin body 1, a main control cabin 2 and a scraping structure. Filtering holes are provided at a bottom end of the cabin body 1, and an anchor frame 7 is fixedly mounted. A top plate 8 is fixedly arranged at a top end of the cabin body 1, and a groove hole is provided in a middle of the top plate 8. The main control cabin 2 is fixedly mounted inside the groove hole the slot, and an electric motor 23 is arranged in the main control cabin 2. A circular groove 32 is provided in a side wall of the main control cabin 2, and the electric motor 23 provides power through a first rotating rod 18 penetrating the side wall of the main control cabin 2. A supporting frame 3 is fixedly mounted at a top end of the top plate 8, and a wind vane 5 and a signal transmitter 6 are fixedly mounted at a top end of the supporting frame 3. The top plate 8 is connected to a solar panel 4 through a connecting rod, and the connecting rod is fixedly mounted at the top end of the top plate 8. The outer wall of the cabin body 1 and the supporting frame 3 each are provided with various sensors, and the scraping structure is arranged on the cabin body 1 and used for removing floating objects on the outer wall of the cabin body 1 and a periphery of the cabin body 1.

In the embodiment solution, when the monitoring device performs monitoring, the device is firstly fixed in a designated sea area by the anchor frame 7, then various indexes of the sea area are collected and monitored by various sensors arranged on the outer wall of the cabin body 1 and the supporting frame 3, and finally, information is transmitted to the nearest monitoring station by the signal transmitter 6, thereby solving the problems: in recent years, with development of polar regions and more and more activities of human beings in the polar regions, some domestic garbage will be generated and thrown into the sea, the device is located a nearshore place during monitoring, although the temperature in the polar regions is relatively low, algae in water bodies can still grow and reproduce when the sunshine is sufficient in summer, and some algae will release toxic substances, which may cause harm to marine organisms; in some cases, the nearshore monitoring device may be attached by the algae, which may be likely to cause corrosion or damage to the surface of the device due to growth of the algae, thus affecting the monitoring device, and causing deviation of collected information. A service life of the device is prolonged, and a monitoring effect of the device is improved. The arranged scraping structure in the present disclosure is used for removing the floating objects on the outer wall of the cabin body 1 and the periphery of the cabin body 1, and can scrape off floating matters on the outer wall of the cabin body 1, such that the floating objects on the outer wall and the periphery of the cabin body 1 are collected, and the floating objects are prevented from corroding or damaging the surface of the device.

The cabin body 1 is of a cylindrical structure, the outer wall of the cabin body 1 is provided with collecting holes 13, and the collecting holes 13 is arc-shaped. The scraping structure includes a scraper 10 and a collecting bucket 9, at least one scraper 10 is arranged outside the cabin body 1, and the collecting bucket 9 is fixed on the scraper 10. A power structure is arranged outside the main control cabin 2 and connected to the first rotating rod 18, and the power structure drives at least one scraper 10 and at least one collecting bucket 9 to rotate relative to the cabin body 1, such that the collecting bucket 9 collects the floating objects on the outer wall and the periphery of the cabin body 1, and the floating objects enter the cabin body 1 through the collecting holes 13.

Three collecting holes 13 are provided as shown in FIGS. 1-8, and the three collecting holes 13 are distributed in an array with a center of the cabin body 1 as an axis. The collecting buckets 9 are slidably arranged on the outer wall of the cabin body 1, three collecting buckets 9 are arranged, and the three collecting buckets 9 are distributed in an array with the center of the cabin body 1 as an axis. The scrapers 10 are fixedly arranged at top ends of the three collecting buckets 9, and the scrapers 10 are slidably arranged on the outer wall of the cabin body 1.

When a plurality of scrapers 10 are arranged, the plurality of scrapers 10 take the center of the cabin body 1 as an axis to form an array, and correspondingly, the plurality of collecting buckets 9 take the center of the cabin body 1 as an axis to form an array.

In this example, the scraping structure is arranged, when the monitoring device runs, firstly, the scraper 10 is driven by the power structure to rotate along the outer wall of the cabin body 1 to scrape off and clear algae attached to the surface of the device, and simultaneously, the collecting bucket 9 is driven to rotate for scraping against the outer wall of the cabin body 1, collect garbage and the algae around the device, and collect the garbage and the algae into the cabin body 1 from the collecting holes 13, such that the problems that the algae may adhere to the device and garbage around the device may affect the monitoring structure of the device are avoided, the monitoring accuracy of the device is enhanced, and a service life of the device is prolonged.

Embodiment 2

Figure 4:
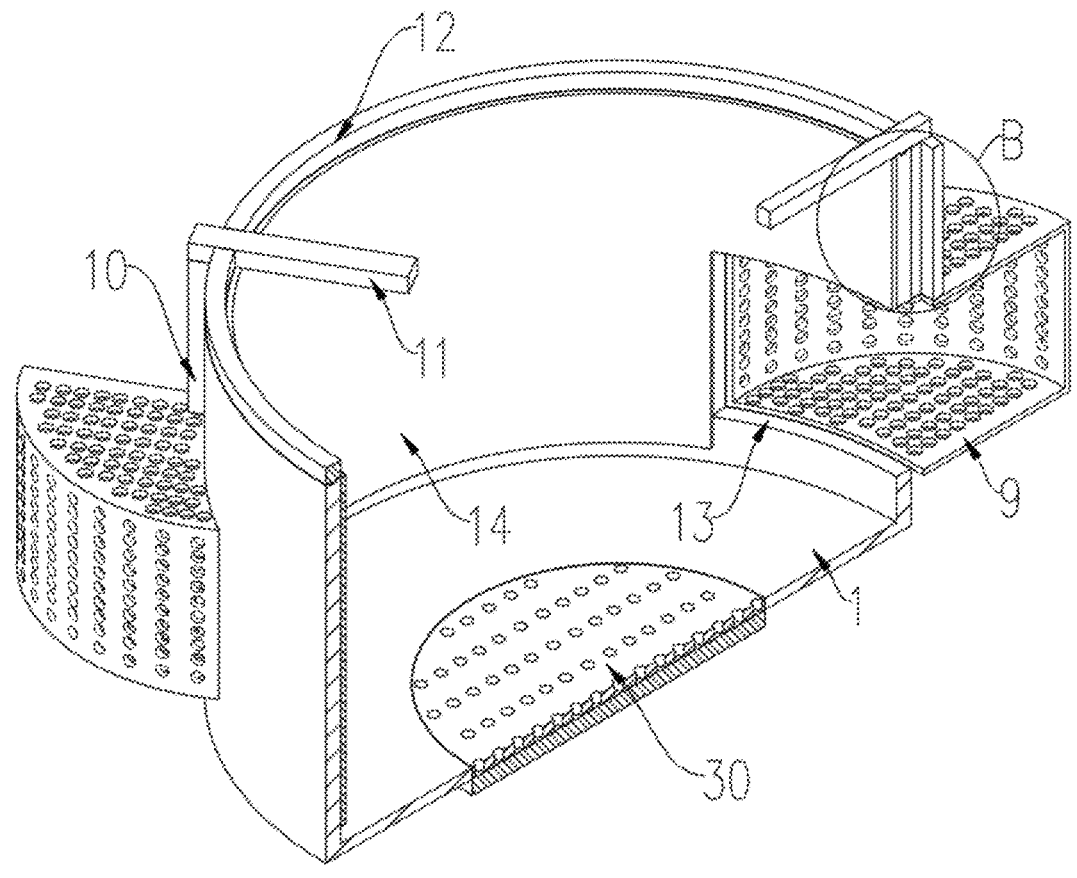
FIG. 4 is a sectional view of a scraping structure of the present disclosure.
Figure 5:
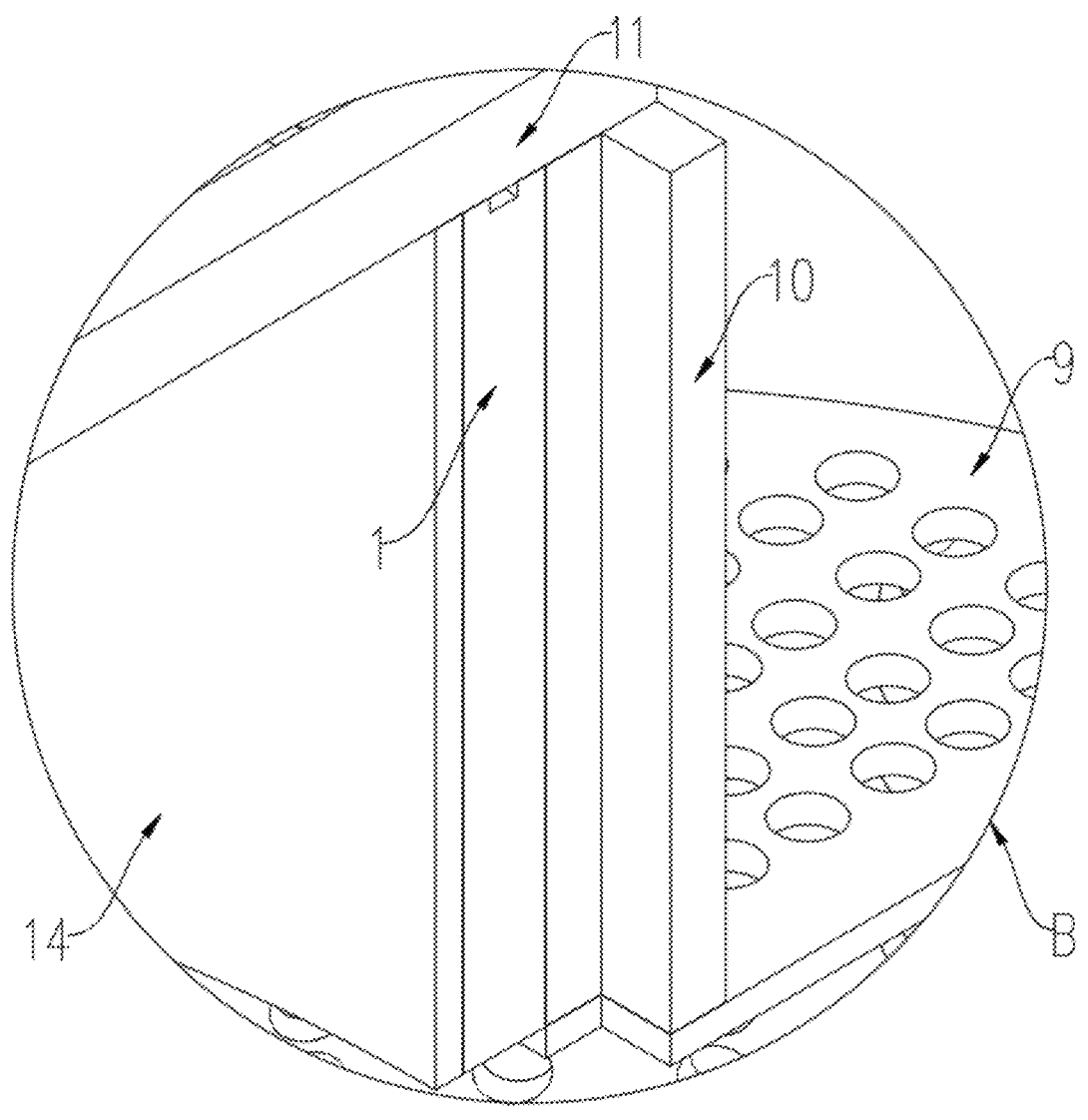
FIG. 5 is an enlarged diagram of portion B in FIG. 4 of the present disclosure.

Referring to FIG. 4, this embodiment further describes Embodiment 1. In FIG. 4, a side wall of the collecting bucket 9 is hollowed out, and the top view of the collecting bucket 9 is a sector.

The floating objects are usually algae or garbage.

In this embodiment, the collecting bucket 9 is arranged, and when the scraper 10 drives the collecting bucket 9 to operate, resistance brought by water can be offset through the hollowed-out design of the side wall of the collecting bucket 9. When the water and the garbage are collected into the inner wall of the collecting bucket 9, the water is discharged, and then, the garbage and the algae are retained. Moreover, the top view of the collecting bucket 9 is the sector, such that after the garbage can be collected into the inner wall of the collecting bucket 9, and then is collected into the inner wall of the cabin body 1 from the collecting holes 13 along the shape of the inner wall of the collecting bucket 9, the problem that the device shakes unstably due to excessive resistance generated by the collecting bucket 9 and the water in the rotating process is solved, the resistance between the collecting bucket 9 and the water is reduced, and the collecting effect of the collecting bucket 9 is also enhanced.

In the present disclosure, the power structure includes a toothed plate 17 and a toothed ring 16, the toothed ring 16 is slidably connected on the main control cabin 2, and the toothed plate 17 is arranged outside the main control cabin 2 and meshed with the toothed ring 16. The toothed plate 17 is fixed on the first rotating rod 18, and the scraper 10 is connected to the toothed ring 16. The electric motor 23 drives the first rotating rod 18 to move, so as to drive the toothed plate 17 connected to the first rotating rod 18 to rotate, thereby making the toothed ring 16 rotate, and making the scraper 10 rotate relative to the cabin body 1.

Figure 3:
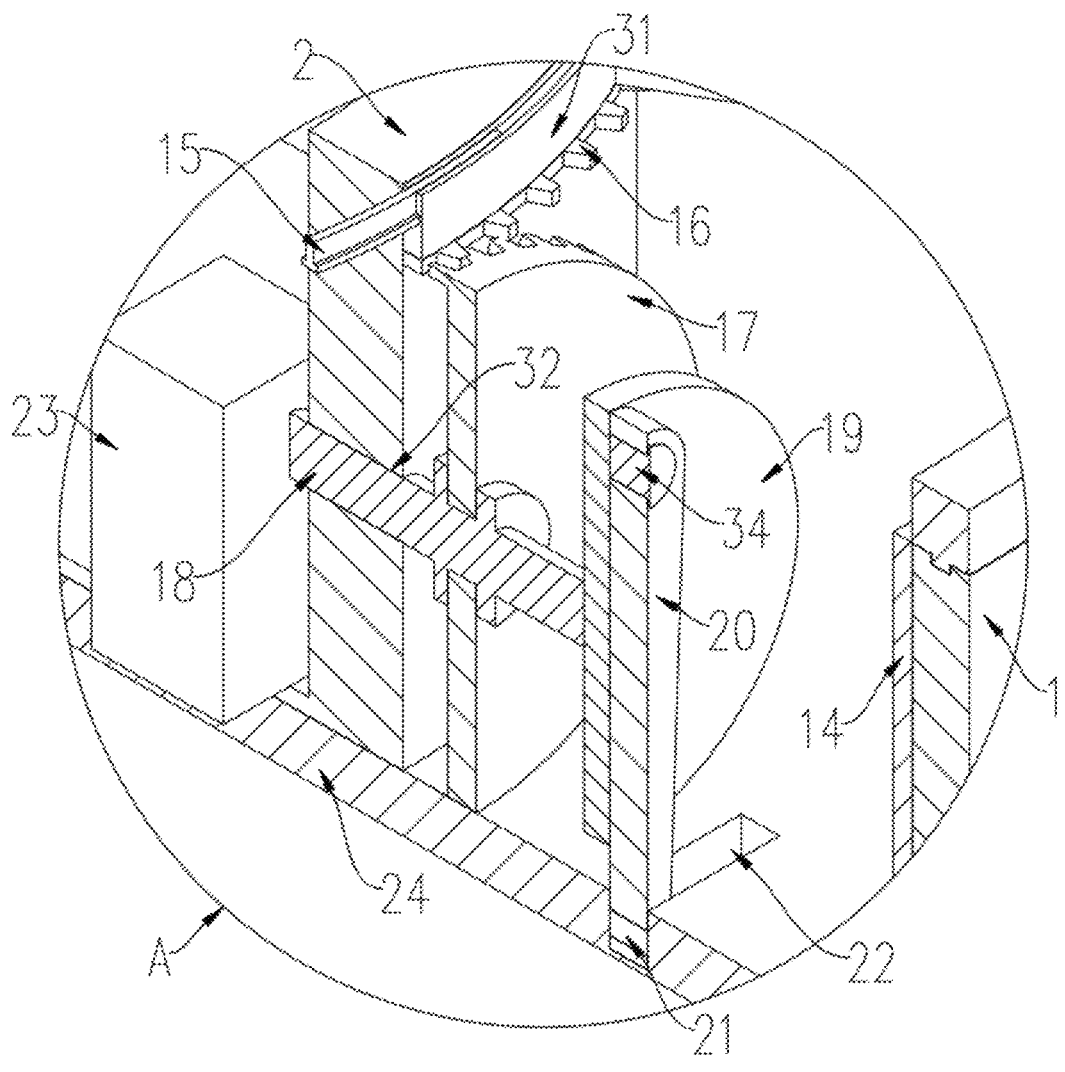
FIG. 3 is an enlarged diagram of portion A in FIG. 2 of the present disclosure.

Referring to FIG. 3, the monitoring device further includes a rotating structure, and the rotating structure transfers power to the power structure so as to drive the scraper 10 to rotate relative to the outer wall of the cabin body 1. The rotating structure includes a supporting rod 11, a sliding ring 12, a circular rotating plate 31 and a T-shaped sliding strip 15, the supporting rod 11 is fixed on the scraper 10, two ends of the sliding ring 12 are fixed on two sides of the supporting rod 11, and the sliding ring 12 is slidably connected on the cabin body 1. The circular rotating plate 31 is fixed on the toothed ring 16, the T-shaped sliding strip 15 is slidably mounted on an inner wall of the circular rotating plate 31, and the T-shaped sliding strip 15 is fixedly mounted on the main control cabin 2.

In this embodiment, the rotating structure is arranged, firstly, when the power structure operates, the circular rotating plate 31 can be driven to slide along an outer wall of the T-shaped sliding strip 15 through the power structure, and then the supporting rod 11 is driven to rotate when the circular rotating plate 31 slides. The supporting rod 11 then drives the scraper 10 to rotate, and at the same time, the sliding ring 12 is driven to rotate along a top end of the cabin body 1, such that the problem that the scraping structure cannot be driven when the power structure is started is solved, and connectivity between the power structure and the scraping structure is improved.

When a plurality of scrapers 10 are arranged, the number of the sliding rings 12 and the supporting rods 11 is consistent with that of the scrapers 10. Both sides of each of the sliding rings 12 are fixedly mounted on one sides of every two supporting rods 11, and the plurality of sliding rings 12 and the plurality of supporting rods 11 are capable of forming a complete circle.

Specifically, three sliding rings 12 are arranged, and the three sliding rings 12 are distributed in an array with the center of the cabin body 1 as an axis.

In this embodiment, the sliding ring 12 and the supporting rod 11 are arranged, when the circular rotating plate 31 drives the supporting rod 11 to rotate, the circular rotating plate 31 and the supporting rod 11 can be attached to form a complete circle and placed between the cabin body 1 and the top plate 8, which can effectively prevent seawater from overflowing into the cabin body 1 when there is wave on the sea surface, thus solving the problem that seawater will overflow into the cabin body 1 from the position between the cabin body 1 and the top plate 8 and cause damage to the internal structure, and enhancing a sealing property of the interior when the device operates.

Figure 2:
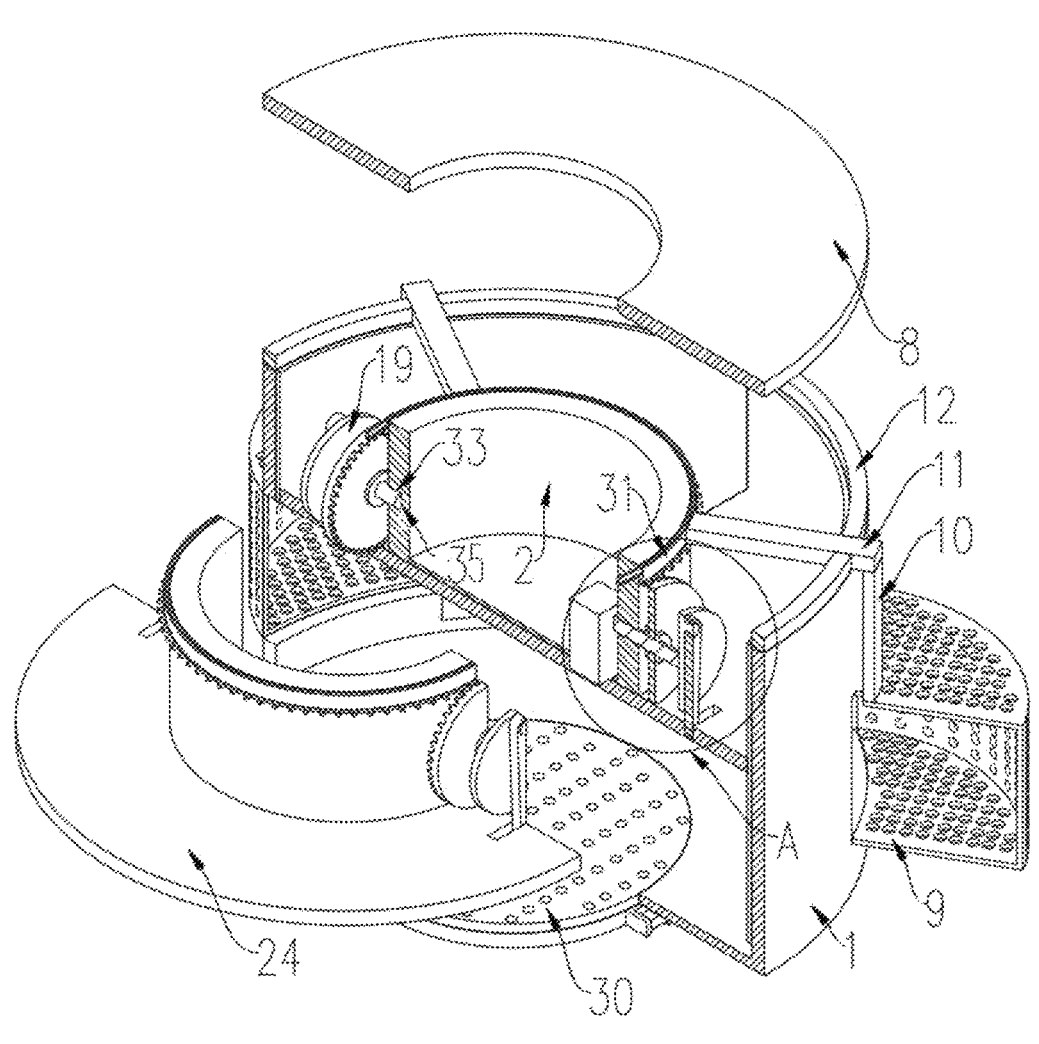
FIG. 2 is an exploded diagram from a sectional view of an internal structure of the present disclosure.

Referring to FIG. 2, in order to keep the device balanced, the side wall of the main control cabin 2 is further provided with a notch type groove hole 33. A second rotating rod 35 is rotationally connected in the notch type groove hole 33, the toothed plate 17 is fixed on the second rotating rod 35, and the toothed plate 17 is meshed with the toothed ring 16. Two toothed plates 17 are symmetrically arranged relative to the main control cabin 2. In the present disclosure, the cabin body 1 is kept balanced by arranging the two toothed plates 17.

In this embodiment, the power structure is arranged, firstly, when the electric motor 23 is started, the electric motor 23 drives the rotating rod to rotate on an inner wall of a circular groove 32, then the rotating rod drives the toothed plate 17 to rotate, and the toothed plate 17 drives the toothed ring 16 to rotate. Meanwhile, the toothed ring 16 drives the toothed plate 17 on one side of the notch type groove hole 33 to rotate, and the toothed plate 17 drives the rotating rod on one side of the notch type groove hole 33 to rotate on the inner wall of the notch type groove hole 33, thus solving the problem that when the device performs monitoring, no internal power is used for starting the scraping structure, and power required for starting the scraping structure is added.

Referring to FIG. 3, teeth of the toothed plate 17 are on the side close to the main control cabin 2 as shown in the figure.

In this embodiment, the toothed plate 17 is arranged, when the toothed plate 17 is driven to rotate by the rotating rod, the electric motor 23 must also be located inside the main control cabin 2 because electronic elements and a power storage apparatus of the device are located inside the main control cabin 2. The toothed ring 16 can be driven to operate by arranging the teeth of the toothed plate 17 on the side close to the main control cabin 2, so as to avoid the conflict between the structures due to a positional relationship, and enhance the linkage and feasibility between the structures.

Figure 6:
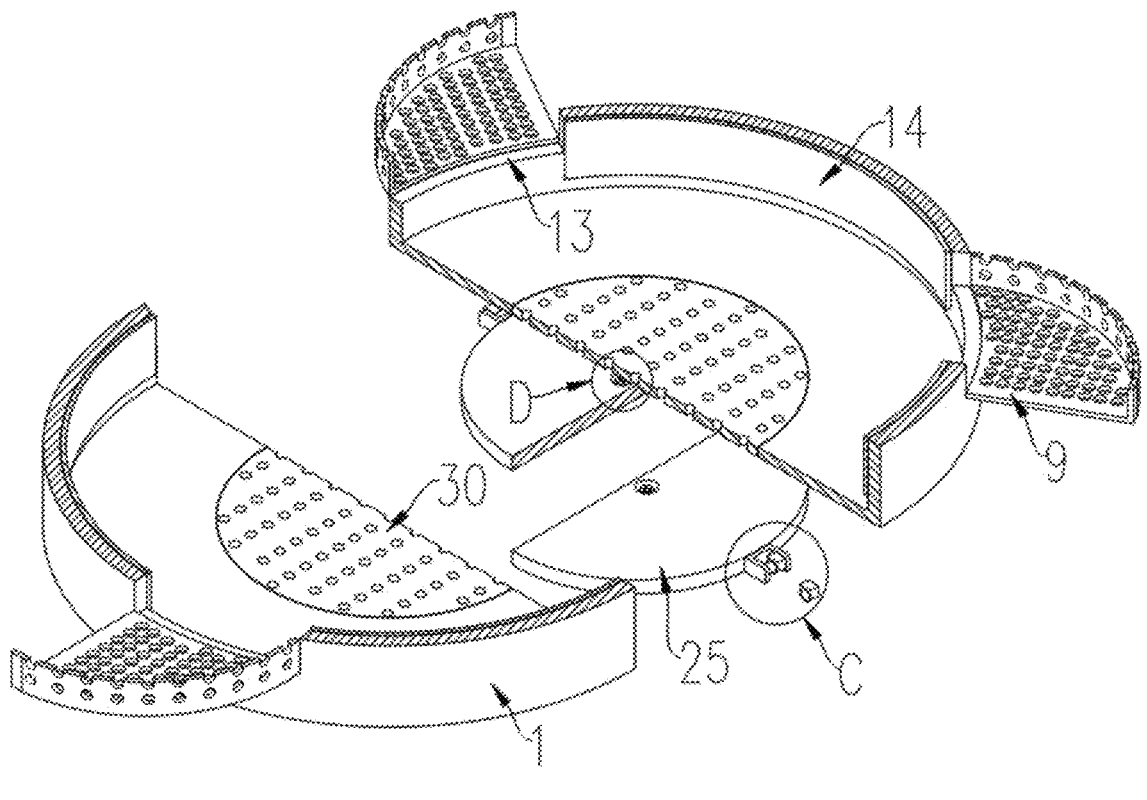
FIG. 6 is an exploded diagram from a sectional view of a filtering structure of the present disclosure.

Referring to FIGS. 3, 4 and 6, the present disclosure further includes an isolation structure. The isolation structure includes a partition plate 14, and the partition plate 14 is fixed on the rotating structure and is arranged at an inner side of the cabin body 1. A notch is provided in the partition plate 14, when the partition plate 14 is driven to rotate by the rotating structure so as to be in communication with the collecting holes 13, the cabin body 1 is opened, and the floating objects are capable of entering the cabin body 1 through the collecting holes 13 and the notch. When the partition plate 14 is driven to rotate by the rotating structure, so as not to be in communication with the collecting holes 13, the cabin body 1 is sealed, and the floating objects fail to enter the cabin body 1 through the collecting holes 13 and the notch.

In this embodiment, the isolation structure is arranged, firstly, when the supporting rod 11 rotates, the supporting rod 11 will drive the partition plate 14 to rotate, and when the notch of the partition plate 14 rotates away from the collecting holes 13, the internal space will be sealed. Meanwhile, a lifting structure will drive a pressing plate 24 to move up and down, and the seawater and garbage in the interior can be pressed to a bottom end of the inner wall of the cabin body 1, thereby solving the problem that the garbage will float out of the cabin body 1 when the garbage and seawater enter the cabin body 1 and the interior of the cabin body is filled up. The collection capacity of the device for the garbage and the algae is improved, and the garbage is prevented from floating out again.

The isolation structure further includes the pressing plate 24, and the pressing plate 24 is slidably connected on an inner wall of the partition plate 14. The partition plate 14 is divided into an upper layer and a lower layer by the pressing plate 24, the notch is provided in the lower layer of the partition plate 14, and the pressing plate 24 is driven to lift by the lifting structure.

Specifically, in the present disclosure, the pressing plate 24 is provided with two lifting structures, and the two lifting structures are symmetrical with respect to the main control cabin 2.

In the present disclosure, the pressing plate 24 is provided with a rectangular groove 22. The lifting structure includes a block-driving rotating plate 19, a supporting strip 20 and a T-shaped block 34, the block-driving rotating plate 19 is fixed to the first rotating rod 18, one end of the T-shaped block 34 is fixed on the block-driving rotating plate 19, and the other end of the T-shaped block is rotationally connected to the supporting strip 20. A bottom end of the supporting strip 20 is provided with a first rotating block 21.

Specifically, in the present disclosure, the pressing plate 24 is provided with two rectangular grooves 22, the two rectangular grooves 22 are symmetrical with respect to the main control cabin 2, and the block-driving rotating plate 19 of the other lifting structure is fixed to the second rotating rod 35.

In this embodiment, the lifting structure is arranged, firstly, when the power structure operates, the rotating rods on the inner walls of the notch type groove hole 33 and the circular groove 32 will drive the block-driving rotating plate 19 to rotate, and the block-driving rotating plate 19 drives the T-shaped block 34 to do circular motion around a center of the block-driving rotating plate 19 as an axis. When the T-shaped block 34 moves, the supporting strip 20 is driven to move up and down, and the supporting strip 20 drives the pressing plate 24 to move up and down, such that the problem that the pressing plate 24 cannot be directly driven to move up and down during operation of the power structure is solved, and linkage between the power structure and the pressing plate 24 is improved.

Figure 7:
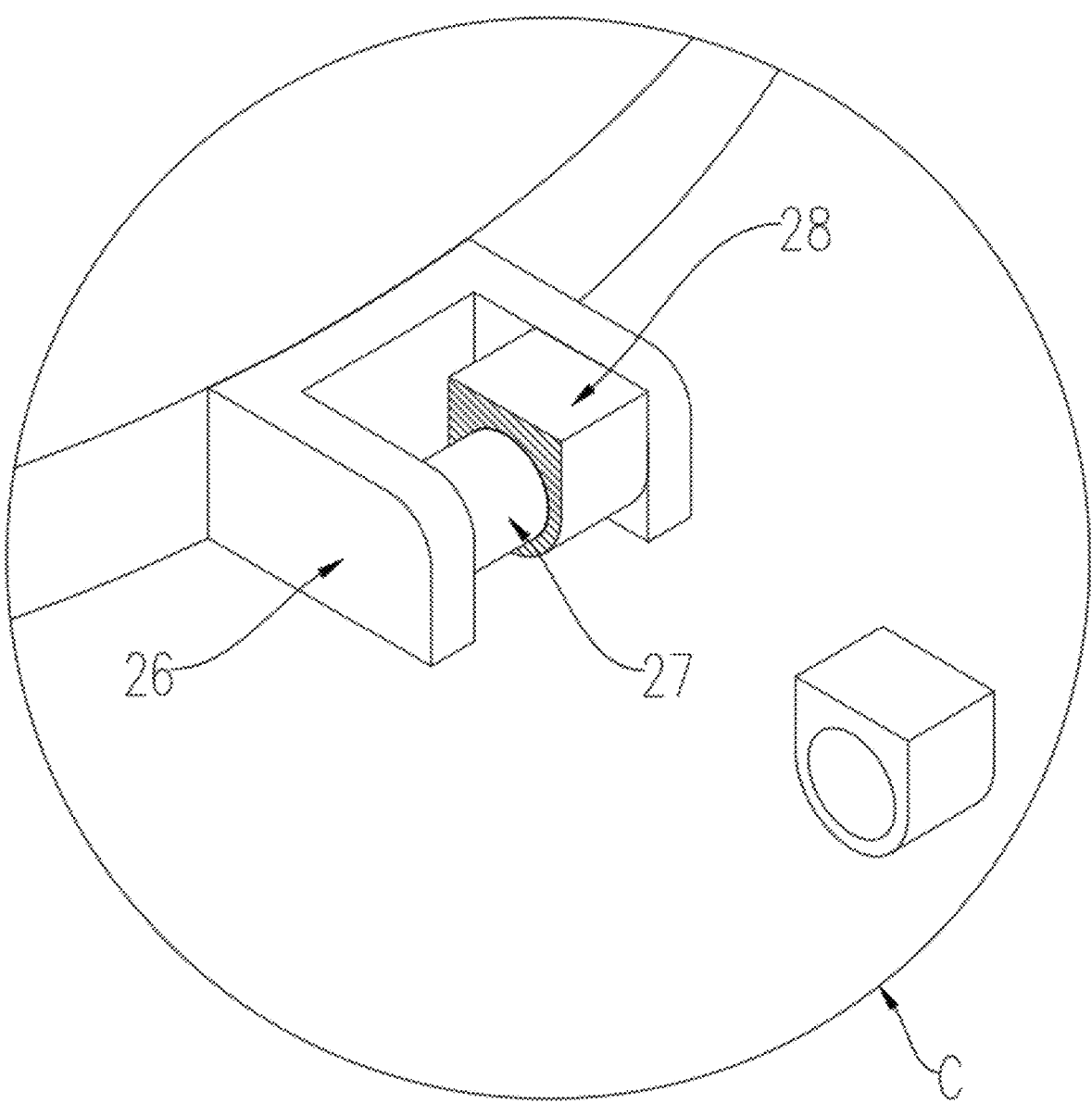
FIG. 7 is an enlarged diagram of portion C in FIG. 6 of the present disclosure.
Figure 8:
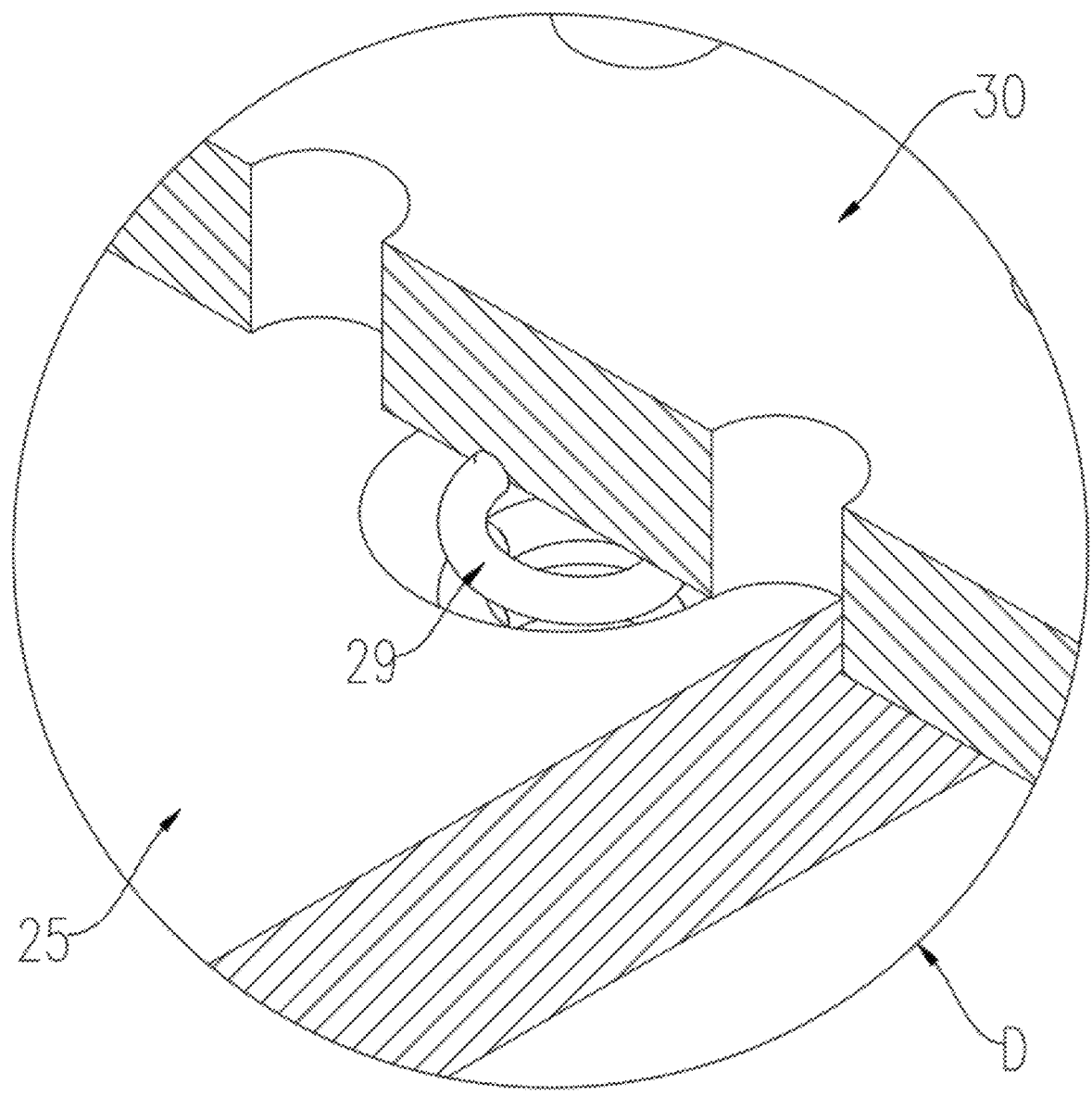
FIG. 8 is an enlarged diagram of portion D in FIG. 6 of the present disclosure.

A filtering structure shown in FIGS. 6-8 includes a filtering plate 30, a baffle plate 25, a U-shaped block 26, a second rotating block 27, a supporting block 28 and a tension spring 29. A groove hole is provided at the bottom end of the cabin body 1, and the filtering plate 30 is fixedly mounted on an inner wall of the groove hole. The supporting block is fixedly mounted on the bottom end of the cabin body 1, two supporting blocks are arranged, and the two supporting blocks are symmetrically distributed with the filtering plate 30 as the center. The second rotating block 27 is fixedly mounted on an inner wall of each supporting block. The U-shaped block 26 is fixedly mounted at both ends of the second rotating block 27, and both ends of the second rotating block 27 are fixedly mounted at the inner side of the U-shaped block 26. The baffle plate 25 is fixedly mounted at the side, far away from the second rotating block 27, of the U-shaped block 26, and the baffle plate 25 is arranged below the filtering plate 30. A groove hole is provided in the baffle plate 25, the tension spring 29 is fixedly mounted at a bottom end of an inner wall of the groove hole, and the other end of the tension spring 29 is fixedly mounted at a bottom end of the filtering plate 30.

In this embodiment, the filtering structure is arranged, firstly, during operation of the isolation structure, when the pressing plate 24 moves downwards, the seawater, the garbage and the algae will be pressed downwards together, the seawater will be discharged from hollowed-out portions of the filtering plate 30, and the garbage and the algae are filtered and retained. Simultaneously, the downward pressure of the seawater will make the baffle plate 25 move downwards, and the baffle plate 25 drives the U-shaped block 26 downwards to make the second rotating block 27 on the inner wall of the supporting block rotate, such that sealing on a bottom end of the filtering plate 30 is released. When the baffle plate 25 is opened downwards, the tension spring 29 will be pulled to generate elastic potential energy. When the seawater in the cabin body 1 is discharged and the pressure on the baffle plate 25 is less than the tension force generated by the tension spring 29, the tension spring 29 will release elastic potential energy to pull the baffle plate 25 back again, such that the baffle plate 25 is attached to the bottom end of the filtering plate 30 again to seal the interior of the cabin body 1, the problems that the garbage floats out of the cabin body 1 when the cabin body 1 is filled with the seawater, and the garbage and the algae cannot be collected into the interior of the cabin body 1 again are solved, and the collection capacity of the device for the garbage and the algae is improved.

Working principle: firstly, the device is placed and fixed in a designated sea area through the anchor frame 7, and various indexes of the sea area are collected and monitored. Then, information is sent to the nearest monitoring station by the signal transmitter 6.

When the electric motor 23 is started, the electric motor 23 will drive the first rotating rod 18 to rotate on the inner wall of the circular groove 32, the first rotating rod 18 will drive the toothed plate 17 to rotate, and the toothed plate 17 will drive the toothed ring 16 to rotate. At the same time, the toothed ring 16 drives the toothed plate 17 on one side of the notch type groove hole 33 to rotate, and the toothed plate 17 then drives the second rotating rod 35 on one side of the notch type groove hole 33 to rotate on the inner wall of the notch type groove hole 33. The toothed ring 16 then drives the circular rotating plate 31 to slide along the outer wall of the T-shaped sliding strip 15. When the circular rotating plate 31 slides, the supporting rod 11 is driven to rotate. The supporting rod 11 then drives the scraper 10 to rotate, and at the same time drives the sliding ring 12 to rotate against a top end of the cabin body 1. The supporting rod 11 then drives the scraper 10 to rotate against the outer wall of the cabin body 1 to scrape off and clear the algae attached to the surface of the device. At the same time, the collecting bucket 9 is driven to rotate for scraping against the outer wall of the cabin body 1. Through the hollowed-out design of the side wall of the collecting bucket 9, the resistance brought by water can be offset, and when the water and the garbage are collected into the inner wall of the collecting bucket 9, the water can be discharged. Then, the garbage and the algae are retained and collected into the inner wall of the cabin body 1 from the collecting holes 13 along the shape of the inner wall of the collecting bucket 9.

At the same time, the second rotating rod 35 on the inner wall of the notch type groove hole 33 and the first rotating rod 18 on the inner wall of the circular groove 32 will separately drive the block-driving rotating plates 19 fixed to same to rotate, and the block-driving rotating plate 19 will drive the T-shaped block 34 to do circular motion by taking the center of the block-driving rotating plate 19 as the axis. When the T-shaped block 34 moves, the supporting strip 20 is then driven to move up and down, and the supporting strip 20 then drives the pressing plate 24 to move up and down. Moreover, the supporting rod 11 will drive the partition plate 14 to rotate. When the notch of the partition 14 rotates to be away from the collecting holes 13, the inner space will be sealed.

Finally, when the pressing plate 24 moves downwards, the seawater, the garbage and the algae will be pressed downwards together, the seawater will be discharged from hollowed-out positions of the filtering plate 30, and the garbage and the algae are filtered. Simultaneously, the downward pressure of the seawater will make the baffle plate 25 move downwards, and the baffle plate 25 drives the U-shaped block 26 downwards to make the second rotating block 27 on the inner wall of the supporting block rotate, such that sealing on a bottom end of the filtering plate 30 is released. When the baffle plate 25 is opened downwards, the tension spring 29 will be pulled to generate elastic potential energy. When the seawater in the cabin body 1 is discharged and the pressure on the baffle plate 25 is less than the tension force generated by the tension spring 29, the tension spring 29 will release elastic potential energy to pull the baffle plate 25 back again, such that the baffle plate 25 is attached to the bottom end of the filtering plate 30 again to seal the interior of the cabin body 1.

It should be noted that relational terms herein such as first and second are only used to distinguish one entity or operation from another entity or operation without necessarily requiring or implying any actual such relationship or order between such entities or operations. Moreover, the terms "including", "comprising" or any other variants thereof are intended to cover non-exclusive inclusion, so that a process, method, article or device including a series of elements not only includes those elements, but also includes those elements that are not explicitly listed, or also includes elements inherent to this process, method, article or device.

It should be noted that relational terms herein such as first and second are only used to distinguish one entity or operation from another entity or operation without necessarily requiring or implying any actual such relationship or order between such entities or operations. Moreover, the terms "comprising", "including" or any other variants thereof are intended to cover non-exclusive inclusion, so that a process, method, article or device including a series of elements not only includes those elements, but also includes those elements that are not explicitly listed, or also includes elements inherent to this process, method, article or device.

Although the embodiments of the present disclosure have been illustrated and described, it should be understood that those of ordinary skill in the art may make various changes, modifications, replacements and variations to the above examples without departing from the principle and spirit of the present disclosure, and the scope of the present disclosure is limited by the appended claims and their legal equivalents.

What is claimed is:

1. A real-time monitoring device for a polar nearshore marine environment, comprising:

a cabin body (1), wherein an outer wall of the cabin body is provided with collecting holes (13);

a main control cabin (2) arranged inside the cabin body (1), wherein an electric motor (23) is arranged in the main control cabin (2), and the electric motor (23) provides power through a first rotating rod (18) penetrating a side wall of the main control cabin (2); and a scraping structure comprising a power structure, a scraper (10) and a collecting bucket (9), wherein at least one scraper (10) is arranged outside the cabin body (1), the collecting bucket (9) is fixed on the scraper (10), the power structure is arranged outside the main control cabin (2) and connected to the first rotating rod (18), the power structure drives at least one scraper (10) and at least one collecting bucket (9) to rotate relative to the cabin body (1), such that the collecting bucket (9) collects floating objects on the outer wall and a periphery of the cabin body (1), and the floating objects enter the cabin body (1) through the collecting holes (13).

2. The real-time monitoring device for the polar nearshore marine environment according to claim 1, wherein a side wall of the collecting bucket (9) is hollowed out, and a cross section of the collecting bucket (9) is a sector.

3. The real-time monitoring device for the polar nearshore marine environment according to claim 1, wherein when a plurality of scrapers (10) are arranged, the plurality of scrapers (10) take a center of the cabin body (1) as an axis to form an array, and correspondingly, the plurality of collecting buckets (9) take the center of the cabin body (1) as an axis to form an array.

4. The real-time monitoring device for the polar nearshore marine environment according to claim 1, wherein the power structure comprises a toothed plate (17) and a toothed ring (16), the toothed ring (16) is slidably connected on the main control cabin (2), the toothed plate (17) is arranged outside the main control cabin (2) and meshed with the toothed ring (16), the toothed plate (17) is fixed on the first rotating rod (18), and the scraper (10) is connected to the toothed ring (16).

5. The real-time monitoring device for the polar nearshore marine environment according to claim 4, further comprising a rotating structure, wherein the rotating structure comprises a supporting rod (11), a sliding ring (12), a circular rotating plate (31) and a T-shaped sliding strip (15), the supporting rod (11) is fixed on the scraper (10), two ends of the sliding ring (12) are fixed on two sides of the supporting rod (11), the sliding ring (12) is slidably connected on the cabin body (1), the circular rotating plate (31) is fixed on the toothed ring (16), the T-shaped sliding strip (15) is slidably mounted on an inner wall of the circular rotating plate (31), and the T-shaped sliding strip (15) is fixedly mounted on the main control cabin (2).

6. The real-time monitoring device for the polar nearshore marine environment according to claim 5, wherein when a plurality of scrapers (10) are arranged, the number of the sliding rings (12) and the supporting rods (11) is consistent with that of the scrapers (10), both sides of each of the sliding rings (12) are fixedly mounted on one sides of every two supporting rods (11), and the plurality of sliding rings (12) and the plurality of supporting rods (11) are capable of forming a complete circle.

7. The real-time monitoring device for the polar nearshore marine environment according to claim 4, further comprising an isolation structure, wherein the isolation structure comprises a partition plate (14), the partition plate (14) is fixed on the rotating structure and is arranged at an inner side of the cabin body (1), a notch is provided in the partition plate (14), when the partition plate (14) is driven to rotate by the rotating structure so as to be in communication with the collecting holes (13), the cabin body (1) is opened, the floating objects are capable of entering the cabin body (1) through the collecting holes (13) and the notch, when the partition plate (14) is driven to rotate by the rotating structure, so as not to be in communication with the collecting holes (13), the cabin body (1) is sealed, and the floating objects fail to enter the cabin body (1) through the collecting holes (13) and the notch.

8. The real-time monitoring device for the polar nearshore marine environment according to claim 7, wherein the isolation structure further comprises a pressing plate (24), the pressing plate (24) is slidably connected on an inner wall of the partition plate (14), the partition plate (14) is divided into an upper layer and a lower layer by the pressing plate, the notch is provided in the lower layer of the partition plate (14), and the pressing plate (24) is driven to lift by a lifting structure.

9. The real-time monitoring device for the polar nearshore marine environment according to claim 8, wherein the pressing plate (24) is provided with a rectangular groove (22), the lifting structure comprises a block-driving rotating plate (19), a supporting strip (20) and a T-shaped block (34), the block-driving rotating plate (19) is fixed to the first rotating rod (18), one end of the T-shaped block (34) is fixed on the block-driving rotating plate (19), the other end of the T-shaped block is rotationally connected to the supporting strip (20), and a bottom end of the supporting strip (20) is provided with a first rotating block (21).

10. The real-time monitoring device for the polar nearshore marine environment according to claim 1, further comprising a filtering structure, wherein the filtering structure comprises a filtering plate (30) and a baffle plate (25), the baffle plate (25) is arranged at a bottom of the filtering plate (30), and the baffle plate (25) is capable of being rotationally connected onto the cabin body.

* * * * *